(12) United States Patent
Yanagida et al.

(10) Patent No.: US 10,403,985 B2
(45) Date of Patent: Sep. 3, 2019

(54) WIRE HARNESS

(71) Applicant: Yazaki Corporation, Tokyo (JP)

(72) Inventors: You Yanagida, Shizuoka (JP);
Kunihiko Yamada, Shizuoka (JP);
Shingo Tanaka, Kanagawa (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/373,439

(22) Filed: Dec. 8, 2016

(65) Prior Publication Data

US 2017/0170575 A1    Jun. 15, 2017

(30) Foreign Application Priority Data

Dec. 9, 2015 (JP) .................................. 2015-240152

(51) Int. Cl.
| H01Q 21/24 | (2006.01) |
| H01Q 1/22 | (2006.01) |
| H01Q 1/32 | (2006.01) |
| H04B 7/04 | (2017.01) |
| H01Q 21/30 | (2006.01) |

(52) U.S. Cl.
CPC ........... H01Q 21/24 (2013.01); H01Q 1/2291 (2013.01); H01Q 1/3291 (2013.01); H01Q 21/30 (2013.01); H04B 7/04 (2013.01)

(58) Field of Classification Search
CPC ........ H04B 7/04; H01Q 21/24; H01Q 1/2291; H01Q 21/30; H01Q 1/3291
See application file for complete search history.

(56) References Cited

U.S. PATENT DOCUMENTS

| 2007/0004363 A1* | 1/2007 | Kusaka | ................. H01Q 1/007 |
| | | | 455/269 |
| 2011/0105049 A1* | 5/2011 | Yamada | ............... H04B 7/0697 |
| | | | 455/68 |
| 2012/0274529 A1* | 11/2012 | Yoshino | ................... H01Q 9/16 |
| | | | 343/791 |
| 2013/0249748 A1 | 9/2013 | Togura et al. | |

(Continued)

FOREIGN PATENT DOCUMENTS

| JP | 5-29867 U | 4/1993 |
| JP | 11-88020 A | 3/1999 |
| JP | 11-177462 A | 7/1999 |

(Continued)

OTHER PUBLICATIONS

Takehiko Kobayashi; "Measurements and Characterization of Ultra Wideband Propagation Channels in a Passenger-Car Compartment", IEICE Trans. Fundamentals, pp. 3089-3094, vol. E89-A, No. 11, Nov. 2006.

(Continued)

*Primary Examiner* — Hai V Tran
*Assistant Examiner* — Michael M Bouizza
(74) *Attorney, Agent, or Firm* — Kenealy Vaidya LLP

(57) ABSTRACT

A wire harness includes plural electric wires provided with a connecting unit at an end portion of the plural electric wires, a first antenna connected to the connecting unit and installed in a wireless terminal, and a second antenna connected to at least one of the plural electric wires. An interval between the first antenna and the second antenna is equal to or longer than $0.3\lambda$.

4 Claims, 3 Drawing Sheets

(56) References Cited

U.S. PATENT DOCUMENTS

2013/0249749 A1    9/2013  Nitta et al.
2015/0097738 A1*   4/2015  Sugimoto ............ H01Q 1/3275
                                                        343/702

FOREIGN PATENT DOCUMENTS

JP      2009-260502  A    11/2009
WO      2012/067244  A1    5/2012

OTHER PUBLICATIONS

Japanese Office Action for the related Japanese Patent Application No. 2015-240152 dated Jan. 23, 2018.

* cited by examiner

WIRE HARNESS

CROSS REFERENCE TO RELATED APPLICATION(S)

The present application claims priority to and incorporates by reference the entire contents of Japanese Patent Application No. 2015-240152 filed in Japan on Dec. 9, 2015.

BACKGROUND OF THE INVENTION

1. Field of the Invention

The present invention relates to a wire harness.

2. Description of the Related Art

Conventionally, when wireless communication has been used inside vehicles, such as automobiles, reception strength has been reported to largely vary due to multiple reflection of narrow band signals in the vehicles. Thus, for example, as disclosed by T. Kobayashi in "Measurements and Characterization of Ultra Wideband Propagation Channels in a Passenger-Car Compartment", IEICE Trans. Fundamentals, pp. 3089-3094, Vol. E89-A, No. 11, November 2006 (hereinafter, "Non-Patent Literature 1"), variation in reception strength is restrained by use of the ultra wideband (UWB) technique, which uses ultra wideband radio.

However, since the method described in the above mentioned Non-Patent Literature 1 uses a wide band, in terms of frequency utilization efficiency, the method is considered to be socially undesirable. For example, with the method described in Non-Patent Literature 1, problems related to electromagnetic compatibility (EMC) and interference are difficult to be cleared, and the method may be unable to be utilized under the current Radio Law. Further, in the method described in Non-Patent Literature 1, since ultra wideband signals are handled, the problem that the load on the transmitting and receiving device is large and the electric current consumed is increased is not negligible. Accordingly, the method described in Non-Patent Literature 1 adopting wideband wireless communication is able to realize restraining in reception strength variation of wireless communication signals in a closed space such as inside of a vehicle, but still has room for further improvement in terms of improving communication quality.

Therefore, in recent years, for use of wireless communication inside a vehicle, such as an automobile, a technique, which restrains reception strength variation of wireless communication signals and improves communication quality, while adopting narrowband wireless communication instead of wideband wireless communication, has been demanded.

As to this demand, as described below with reference to FIG. 5 to FIG. 7, restraining the reception strength variation of wireless communication signals and improving the communication quality by utilization of various types of diversity in narrowband wireless communication may be considered. Diversity herein refers to a technique for improving quality or reliability of communication by, for the same radio signals received through plural antennas, preferentially using a signal of an antenna with better radio wave conditions, or combining the received signals and removing noise therefrom.

For example, as illustrated in FIG. 5, when a space diversity scheme is adopted and a wireless terminal 10 equipped with two antennas (an antenna A1 and an antenna A2 in FIG. 5) is used, a minimum of reception strength is able to be avoided by the use of plural antennas. Further, the space diversity effect is effective when an interval L between the two antennas A1 and A2 is made equal to or longer than "0.3λ". Herein, λ means a wavelength at a used frequency "f". When the used frequency "f" is expressed in "MHz", "λ=300/f [m]". Thus, if, for example, "1 GHz" is used, "0.3λ" equals about "15 cm". When a size of the wireless terminal 10 is "15 cm", the space diversity scheme may be adopted, but when the wireless terminal 10 is downsized to a size less than "15 cm", the space diversity scheme is unable to be adopted.

Further, as illustrated in FIG. 6, when a polarization diversity scheme is adopted and a wireless terminal 10 equipped with antennas A1 and A2 of two types is used, the antenna A1 is able to be caused to function as a vertical polarization antenna, and the antenna A2 is able to be caused to function as a horizontal polarization antenna. Accordingly, since reflection properties are different between horizontal polarization and vertical polarization, in the wireless terminal 10 of FIG. 6, by using together the antennas A1 and A2 of the two types, the horizontal polarization and the vertical polarization, a minimum of reception strength is able to be avoided. However, in the example in FIG. 6 also, since the wireless terminal 10 needs to be equipped with the antennas A1 and A2 of the two types, the wireless terminal 10 itself is difficult to be downsized.

Moreover, as illustrated in FIG. 7, when a pass diversity scheme or a directional diversity scheme is adopted and a wireless terminal 10 equipped with adaptive array antennas A1 to A4 is used, a minimum of reception strength is able to be avoided. In the example of FIG. 7 also, like the example illustrated in FIG. 5, making intervals L between the respective antennas A1 to A4 equal to or longer than "0.3λ" is effective. In this example of FIG. 7, a multi-input multi-output (MIMO) or space division multiple access (SDMA) system, which is diversity combined with the idea of the adaptive array antennas, is able to be realized. However, in the example of FIG. 7 also, since the wireless terminal 10 needs to be equipped with the respective antennas A1 to A4 forming the adaptive array antennas, the wireless terminal 10 itself is difficult to be downsized.

As described above, in the examples illustrated in FIG. 5 to FIG. 7, by utilizing various types of diversity in narrowband wireless communication, the reception strength variation of wireless communication signals is able to be restrained and the communication quality is able to be improved, but there is room for further improvement for the wireless terminals becoming comparatively large-sized.

SUMMARY OF THE INVENTION

The present invention has thus been made in view of the above circumstances, and an object thereof is to provide a wire harness that enables a diversity MIMO/SDMA system to be realized in a closed space, such as inside an automobile, the diversity MIMO/SDMA system adopting narrowband wireless communication and without a wireless terminal becoming large-sized.

In order to achieve the above mentioned object, a wire harness according to one aspect of the present invention includes plural electric wires provided with a connecting unit at an end portion of the plural electric wires; a first antenna connected to the connecting unit and installed in a wireless terminal; and a second antenna connected to at least one of the plural electric wires, wherein an interval between the first antenna and the second antenna is equal to or longer than 0.3λ.

According to another aspect of the present invention, in the wire harness, it is preferable to further include a third antenna connected to at least one of the plural electric wires at a position having an interval equal to or longer than $0.3\lambda$ from the second antenna toward an extending direction of the electric wires than the second antenna.

In order to achieve the above mentioned object, a wire harness according to still another aspect of the present invention includes plural electric wires provided with a connecting unit at an end portion of the plural electric wires; a first antenna that is connected to the connecting unit, is installed in a wireless terminal, and adopts any one of a horizontal polarization scheme and a vertical polarization scheme; and a second antenna that is connected to at least one of the plural electric wires, and adopts the other one of the horizontal polarization scheme and the vertical polarization scheme.

According to still another aspect of the present invention, in the wire harness, it is preferable to further include a third antenna connected to at least one of the plural electric wires, the third antenna adopting the other scheme different from the one of the horizontal polarization scheme and the vertical polarization scheme adopted by the second antenna.

In order to achieve the above mentioned object, a wire harness according to still another aspect of the present invention includes plural electric wires provided with a connecting unit at an end portion of the plural electric wires; a first antenna that is connected to the connecting unit, is installed in a wireless terminal, and is one antenna of array antennas composed of plural antennas; and remaining plural antennas of the array antennas, the remaining plural antennas being connected to at least one of the plural electric wires and being other than the one antenna installed in the wireless terminal, wherein an interval between the respective antennas constituting the array antennas is equal to or longer than $0.3\lambda$.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments according to the present invention will be described in detail, based on the drawings. The present invention is not limited by these embodiments. Further, components in the following embodiments include those that are substitutable by persons skilled in the art and simple, or those that are substantially the same.

First Embodiment

Figure 1:
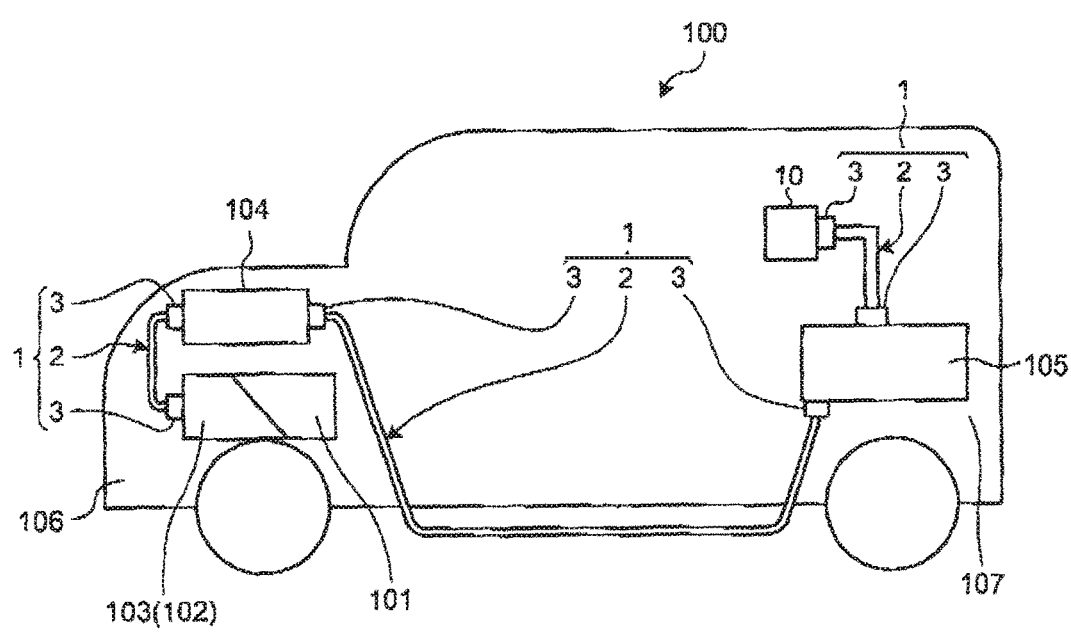
FIG. 1 is a schematic diagram illustrating a routing state of a wire harness according to a first embodiment of the present invention.
Figure 2:
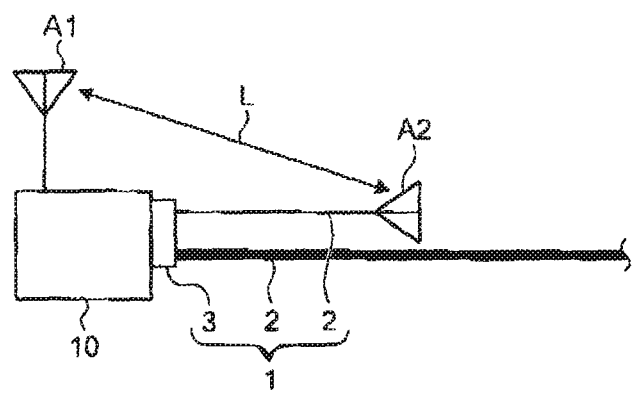
FIG. 2 is a schematic configuration diagram illustrating the wire harness connected to a wireless terminal according to the first embodiment of the present invention.

FIG. 1 is a schematic diagram illustrating a routing state of a wire harness according to a first embodiment of the present invention. FIG. 2 is a schematic configuration diagram illustrating a wire harness connected to a wireless terminal according to the first embodiment of the present invention.

A wire harness 1 of this embodiment illustrated in FIG. 1 includes electric wires 2, and a connector 3 serving as a connecting unit and provided at both end portions of the electric wires 2; and for example, in order to connect between respective devices installed in a vehicle 100, the wire harness 1 has a collection of parts, the collection being a bundle of the plural electric wires 2 used in power supply or signal communication, and connects the plural electric wires 2 to the respective devices at once with the connector 3. The wire harness 1 may be configured to additionally include, for example, an exterior member, such as a corrugate tube, a resin tape, or a protector, and any of various components, such as an electrical connection box (junction box), a grommet, and a fixture.

Firstly, with reference to FIG. 1, the vehicle 100, to which the wire harness 1 of this embodiment is applied, will be described. An example will be described, where the vehicle 100 is a hybrid vehicle (HV) including both of an engine 101 and a motor generator 102, which serve as a power source for traveling. The vehicle 100 includes: the engine 101, a motor unit 103 including the motor generator 102, an inverter unit 104, a battery (secondary battery) unit 105, and a wireless terminal 10. When electric power from the battery unit 105 is supplied to the motor unit 103 via the inverter unit 104, the motor generator 102 is driven. The vehicle 100 is caused to travel by driving power generated by the engine 101 or the motor generator 102, or by both of the engine 101 and the motor generator 102. In the vehicle 100 of this embodiment, the engine 101, the motor unit 103, and the inverter unit 104 are installed in an engine room 106 at a front side of the vehicle, and the battery unit 105 and the wireless terminal 10 are installed in an accommodating unit 107 at a rear side of the vehicle. The wire harness 1 of this embodiment electrically connects between the respective devices that use electric power of comparatively high voltage in the vehicle 100, such as between the motor unit 103 and the inverter unit 104, between the inverter unit 104 and the battery unit 105, and between the battery unit 105 and the wireless terminal 10; and forms a high voltage system that supplies high voltage power between the respective devices.

The electric wires 2 constituting the wire harness 1 of this embodiment include at least a conductor and a covering member. The electric wires 2 of this embodiment are cable wires, such as so-called cabtire cables, each having a sheath (a protective outer covering) serving as the covering member on an outer peripheral side of an insulated wire (or insulated wires twisted together) configured to include the conductor. Not being limited to the cabtire cables, the electric wires may be other cable wires, such as so-called coaxial cables each including a sheath serving as the covering member. The wire harness 1 of this embodiment includes the above described electric wires 2, and the connector 3 provided at the both end portions of the electric wires 2. For example, the wireless terminal 10 that enables wireless communication in the vehicle 100 is connected to the connector 3.

When wireless communication is performed in the vehicle 100 by use of this wireless terminal 10, since inside of the vehicle 100 is a closed space where layout of the respective devices is limited, the wireless terminal 10 is desirably downsized while reception strength variation of wireless communication signals is restrained and communication quality is improved. In order to restrain the reception strength variation of wireless communication signals and improve the communication quality, one may consider installation of plural antennas and adoption of space diversity scheme. However, when downsizing of the wireless terminal 10 is prioritized, the number of antennas mountable on the wireless terminal 10 is limited. Thus, if downsizing of the wireless terminal 10 is prioritized, restraint in the reception strength variation of wireless communication signals and improvement in the communication quality become difficult.

Therefore, in the wire harness 1 of this embodiment, as illustrated in FIG. 2, separately from a first antenna A1 installed in the wireless terminal 10, a second antenna A2 is mounted on the wire harness 1. In FIG. 2, the wireless terminal 10 equipped with the first antenna A1 is connected to the connecting unit, which is the connector 3 constituting the wire harness 1. Along an extending direction of the electric wires 2 constituting the wire harness 1, the second antenna A2 is attached to the electric wires 2. As described above, the wire harness 1 of this embodiment is configured to include: the plural electric wires 2 provided with the connecting unit, which is the connector 3, at the end portions thereof; the first antenna A1 connected to the connecting unit and installed in the wireless terminal 10; and the second antenna A2 connected to at least one of the plural electric wires 2. In the wire harness 1 of this embodiment, an interval L between the first antenna A1 and the second antenna A2 is equal to or longer than "$0.3\lambda$". An upper limit of the interval L between the first antenna A1 and the second antenna A2 is an appropriate value in a manufacturable range, that is, a range installable in the vehicle.

As described above, the wire harness 1 of this embodiment realizes downsizing of the wireless terminal 10, and at the same time, realizes diversity in wireless communication. The second antenna A2 attached to the electric wires 2 of this wire harness 1, for example, is downsized by use of a dielectric substance, and is designed to be able to be bundled integrally with the wire harness 1. Therefore, increase in volume due to the attachment of the second antenna A2 to the wire harness 1 is able to be kept low to a substantially negligible level.

Although the example where the number of antennas is two has been described with reference to FIG. 2, if the number of antennas is more than two, the space diversity effect is able to be improved even further. For example, although illustration is omitted, in the wire harness 1 of FIG. 2, a third antenna A3 is preferably connected to at least one of the plural electric wires 2, at a position having an interval equal to or longer than "$0.3\lambda$" from the second antenna A2, toward the extending direction of the electric wires 2 than the second antenna A2. When these three antennas, the first antenna A1, the second antenna A2, and the third antenna A3, are used, if space diversity is realized by use of only the second antenna A2 and the third antenna A3 mounted on the wire harness 1, the first antenna A1 does not need to be mounted on the wireless terminal 10. Thereby, while the reception strength variation of wireless communication signals is restrained, and the communication quality is improved, the wireless terminal 10 is able to be downsized even further, too.

Second Embodiment

Figure 3:
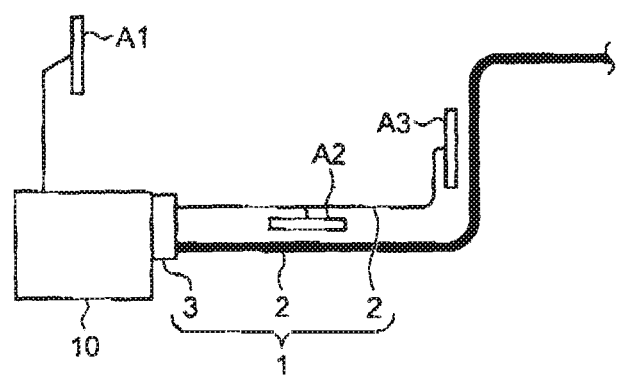
FIG. 3 is a schematic configuration diagram illustrating a wire harness connected to a wireless terminal according to a second embodiment of the present invention.

FIG. 3 is a schematic configuration diagram illustrating a wire harness connected to a wireless terminal according to a second embodiment of the present invention. In the first embodiment, the example where the space diversity scheme is adopted has been described, but in the second embodiment, as follows, an example where a polarization diversity scheme is adopted will be described.

As illustrated in FIG. 3, when the polarization diversity scheme is adopted also, separately from a first antenna A1 installed in a wireless terminal 10, a second antenna A2 is mounted on a wire harness 1. In FIG. 3, the wireless terminal 10 equipped with the first antenna A1 (a vertical polarization antenna, for example, in FIG. 3) adopting any one of a horizontal polarization scheme and a vertical polarization scheme is connected to a connecting unit, which is a connector 3 constituting the wire harness 1. Further, the second antenna A2 (a horizontal polarization antenna, for example, in FIG. 3) adopting the other one of the horizontal polarization scheme and, the vertical polarization scheme is attached, along an extending direction of electric wires 2 constituting the wire harness 1, to the electric wires 2. Accordingly, the wire harness 1 of this embodiment is configured to include: the plural electric wires 2 provided with the connecting unit at an end portion thereof; the first antenna A1 that is connected to the connecting unit, is installed in the wireless terminal 10, and adopts any one of the horizontal polarization scheme and the vertical polarization scheme; and the second antenna A2 that is connected to at least one of the plural electric wires 2 and adopts the other one of the horizontal polarization scheme and the vertical polarization scheme.

Thereby, by use of the antennas A1 and A2 of the two types together, the antennas A1 and A2 having reflection properties different between horizontal polarization and vertical polarization, a minimum of reception strength is able to be avoided with the wire harness 1 of this embodiment. Further, since only the antenna A1 needs to be installed at the wireless terminal 10 side, downsizing of the wireless terminal 10 is able to be realized simultaneously.

Furthermore, as illustrated in FIG. 3, in the wire harness 1 of this embodiment, a third antenna A3 (a vertical polarization antenna, for example, in FIG. 3) is preferably connected to at least one of the plural electric wires 2, the third antenna A3 adopting the other scheme different from the one of the horizontal polarization scheme and the vertical polarization scheme adopted by the second antenna A2. As described above, according to the wire harness 1 of this embodiment, when the polarization diversity scheme is adopted, not only polarization diversity is able to be realized by the first antenna A1 and the second antenna A2, but also polarization diversity is able to be realized by the second antenna A2 and the third antenna A3.

With respect to FIG. 3, the example, where the three antennas, the first antenna A1, the second antenna A2, and the third antenna A2, are used, has been described, but the embodiment is not limited to this example. For example, if polarization diversity is realized by only the second antenna A2 and the third antenna A3 installed on the wire harness 1, the first antenna A1 does not need to be mounted on the wireless terminal 10, and while the reception strength variation of wireless communication signals is restrained and the communication quality is improved, the wireless terminal 10 is able to be downsized even further.

Third Embodiment

Figure 4:
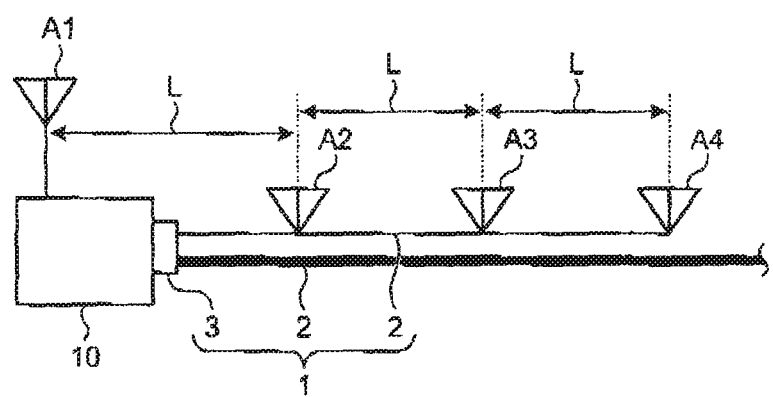
FIG. 4 is a schematic configuration diagram illustrating a wire harness connected to a wireless terminal according to a third embodiment of the present invention.
Figure 5:
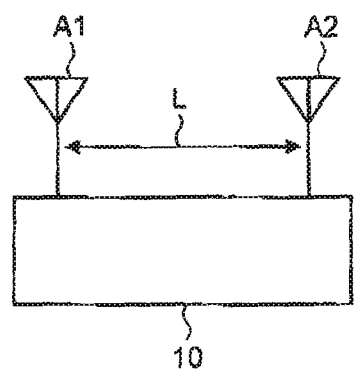
FIG. 5 is an explanatory diagram illustrating a conventional example of a wireless terminal adopting a space diversity scheme in narrowband wireless communication and equipped with two antennas.
Figure 6:
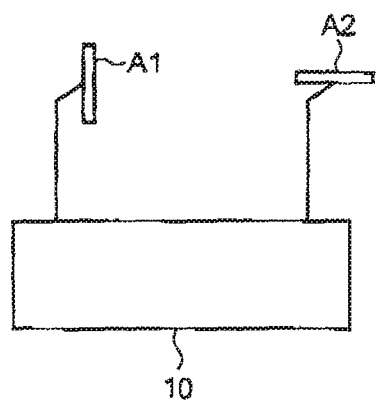
FIG. 6 is an explanatory diagram illustrating a conventional example of a wireless terminal adopting a polarization diversity scheme in narrowband wireless communication and equipped with antennas of two types.
Figure 7:
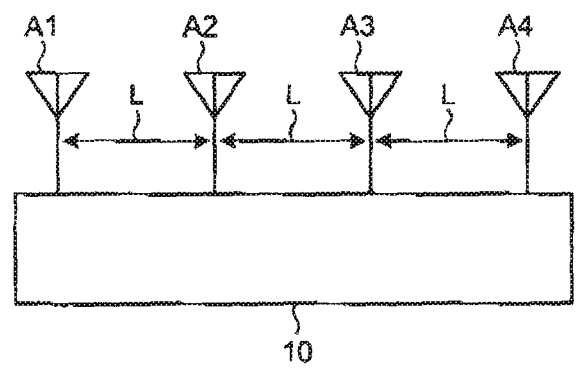
FIG. 7 is an explanatory diagram illustrating a conventional example of a wireless terminal adopting a pass diversity scheme or a directional diversity scheme in narrowband wireless communication and equipped with adaptive array antennas.

FIG. 4 is a schematic configuration diagram illustrating a wire harness connected to a wireless terminal according to a third embodiment of the present invention. In addition to the space diversity scheme of the first embodiment and the polarization diversity scheme of the second embodiment, as follows, a case will be described, where a pass diversity scheme or a directional diversity scheme is adopted and a wireless terminal 10 equipped with adaptive array antennas A1 to A4 is used.

As illustrated in FIG. 4, when the pass diversity or directional diversity scheme is adopted and the array antennas are used, separately from the first antenna A1 installed in the wireless terminal 10, the second antenna A2, the third antenna A3, and the fourth antenna A4 are mounted on the wire harness 1. In FIG. 4, the wireless terminal 10 equipped with the first antenna A1, which is one antenna from the array antennas composed of the plural antennas A1 to A4, is connected to a connecting unit, which is a connector 3 constituting the wire harness 1. Further, the second antenna A2, the third antenna A3, and the fourth antenna A4 are attached, along an extending direction of electric wires 2 constituting the wire harness 1, to the electric wires 2; the second antenna A2, the third antenna A3, and the fourth antenna A4 being the remaining plural antennas excluding the first antenna A1 installed in the wireless terminal 10, from the array antennas. Accordingly, the wire harness 1 of this embodiment is configured to include: the plural electric wires 2 provided with the connecting unit at an end portion thereof; the first antenna A1 that is connected to the connecting unit, is installed in the wireless terminal 10, and is one antenna of the array antennas composed of the plural antennas; and the remaining plural antennas A2 to A4, which are connected to at least one of the plural electric wires 2, and are other than the one antenna installed in the wireless terminal 10, of the array antennas. Intervals L between the respective antennas A1 to A4 constituting the array antennas are equal to or longer than "0.3λ". An upper limit of the intervals L between the respective antennas A1 to A4 is an appropriate value in a manufacturable range, that is, a range installable in the vehicle.

The wire harness 1 of this embodiment is applicable to MIMO or SDMA, which is the diversity combined with the idea of the adaptive array antennas. With respect to the example of FIG. 4, the example, where the array antennas are formed of the four antennas, has been described, but for the case of MIMO/SDMA, the greater the number of antennas is, the larger the effects become, and thus the number of antennas may be equal to or greaten than four. In this case, the diversity effect is improved even further. Moreover, in the example of FIG. 4, the example, where the first antenna A1 is mounted on the wireless terminal 10, has been described, but the embodiment is not limited to this example. If a configuration, in which plural antennas forming array antennas are mounted on the wire harness 1, is adopted, the first antenna A1 does not need to be mounted on the wireless terminal 10, and while the reception strength variation of wireless communication signals is restrained and the communication quality is improved, the wireless terminal 10 is also able to be downsized even further.

As described above, according to any of the above described wire harnesses 1 of the first embodiment to the third embodiment, the diversity technique with the antenna mounted in the unit and the antenna mounted in the wire harness is able to be realized, and thus an effect of enabling a diversity MIMO/SDMA system to be realized in a closed space, such as inside an automobile, is able to achieved, the diversity MIMO/SDMA system adopting narrowband wireless communication and without the wireless terminal becoming large-sized.

A wire harness according to the embodiments has an effect of enabling a diversity MIMO/SDMA system to be realized in a closed space, such as inside an automobile, the diversity MIMO/SDMA system adopting narrowband wireless communication and without a wireless terminal becoming large-sized.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness comprising:
   a first electric wire provided with a connecting unit at a first end portion of the first electric wire, the connecting unit is connected to a wireless terminal, the first electric wire lies outside of the wireless terminal, the first electric wire is provided with a second connecting unit at a second end portion, the second connecting unit is configured to connect to a battery unit;
   a second electric wire provided with the connecting unit at an end portion of the second electric wire, and the second electric wire lies outside of the wireless terminal and extends along the first electric wire;
   a first antenna connected to the connecting unit and installed in the wireless terminal;
   a second antenna disposed on the second electric wire; and
   a third antenna disposed on the second electric wire at a position having a distance equal to or longer than 0.3λ from the second antenna in an extending direction of the second electric wire from the second antenna, wherein
   an interval between the first antenna and the second antenna is equal to or longer than 0.3λ.

2. The wire harness according to claim 1, wherein the third antenna is disposed on an end of the second electric wire opposite to the connecting unit.

3. A wire harness comprising:
   a first electric wire provided with a connecting unit at a first end portion of the first electric wire, the connecting unit is connected to a wireless terminal, the first electric wire lies outside of the wireless terminal, the first electric wire is provided with a second connecting unit at a second end portion, the second connecting unit is configured to connect to a battery unit;
   a second electric wire provided with the connecting unit at an end portion of the second electric wire, and the second electric wire lies outside of the wireless terminal and extends along the first electric wire;

a first array antenna that is connected to the connecting unit and is installed in the wireless terminal;

a second array antenna disposed on the second electric wire at a distance of equal to or longer than $0.3\lambda$ from the first array antenna; and a plurality of other array antennas disposed on the second electric wire at an interval equal to or longer than $0.3\lambda$ from the second array antenna in an extending direction of the second electric wire from the second array antenna.

4. The wire harness according to claim 3, wherein one of the plurality of other array antennas is disposed on an end of the second electric wire opposite to the connecting unit.

* * * * *